United States Patent [19]

Kametani

[11] Patent Number: 5,107,420
[45] Date of Patent: Apr. 21, 1992

[54] SYNCHRONOUS APPARATUS FOR PROCESSORS

[75] Inventor: Masatsugu Kametani, Shimoinayoshi, Japan

[73] Assignee: Hitachi, Ltd., Tokyo, Japan

[21] Appl. No.: 84,804

[22] Filed: Aug. 13, 1987

[30] Foreign Application Priority Data

Aug. 13, 1986 [JP] Japan ................. 61-188463

[51] Int. Cl.$^5$ ............................................ G06F 15/16
[52] U.S. Cl. ................... 395/650; 364/230; 364/230.3; 364/247.3; 364/221.9; 364/DIG. 1
[58] Field of Search ... 364/200 MS File, 900 MS File; 370/104

[56] References Cited

U.S. PATENT DOCUMENTS

| 3,810,119 | 5/1974 | Zieve et al. | 364/200 |
|---|---|---|---|
| 3,896,418 | 7/1975 | Brown | 364/200 |
| 4,071,890 | 1/1978 | Pandeya | 364/200 |
| 4,229,792 | 10/1980 | Jensen et al. | 364/200 |
| 4,330,826 | 5/1982 | Whiteside et al. | 364/200 |
| 4,344,134 | 8/1982 | Barnes | 364/200 |
| 4,369,494 | 1/1983 | Bienvenu et al. | 364/200 |
| 4,380,046 | 4/1983 | Fung | 364/200 |
| 4,408,327 | 11/1983 | Wahl | 371/47.1 |
| 4,412,303 | 10/1983 | Barnes et al. | 364/900 |
| 4,412,342 | 10/1983 | Khan | 375/107 |
| 4,484,273 | 11/1984 | Stiffler | 364/200 |
| 4,493,053 | 1/1985 | Thompson | 364/900 |
| 4,569,017 | 2/1986 | Renner et al. | 364/200 |
| 4,589,066 | 5/1986 | Lam et al. | 364/200 |
| 4,590,555 | 5/1986 | Bowviez | 364/200 |
| 4,591,976 | 5/1986 | Webber et al. | 364/200 |
| 4,591,977 | 5/1986 | Nissen et al. | 364/200 |
| 4,626,989 | 12/1986 | Torii | 364/200 |
| 4,733,353 | 3/1988 | Jaswa | 364/200 |
| 4,794,521 | 12/1988 | Ziegler et al. | 364/200 |

FOREIGN PATENT DOCUMENTS 0176464 2/1986 European Pat. Off. .
2131987 6/1984 United Kingdom .

OTHER PUBLICATIONS

PCT: G06F 11/08, Fault Tolerant, Frame Synchronization for Multiple Processor Systems, Fook-Tse: May 31, 1984.

Primary Examiner—Thomas C. Lee
Assistant Examiner—Eric Coleman
Attorney, Agent, or Firm—Antonelli, Terry, Stout & Kraus

[57] ABSTRACT

A synchronous apparatus for synchronizing a plurality of processors includes: a register for storing information regarding a group of processors executing parallel processing for associated tasks; a unit for making active the task end information of a processor; a comparator for comparing the information stored in the register belonging to the group with the task end information to check if a synchronization in the group has been completed; a signal line for transferring the task end information to the comparator; and a unit for transferring a comparison result by the comparator to the processor.

18 Claims, 4 Drawing Sheets

SYNCHRONOUS APPARATUS FOR PROCESSORS

BACKGROUND OF THE INVENTION

The present invention relates to a multiprocessor system, and more particularly to a synchronous apparatus suitable for synchronizing processors.

Conventional synchronous processing for multiprocessors basically adopts a synchronizing (or process ordering) scheme for tasks wherein tasks are processed based on a task driven order or a data driven order. In case of general purpose multi-processors, a data flow processing scheme or a token control scheme has been adopted wherein task end flags are provided in a common memory in order for each task to check if all necessary preceding task processes have been completed.

A synchronous processing of this type is described in Japanese publication "Multi-microprocessor System", pp. 117 to 122, Keigaku Shuppan, November 1984.

An example of conventional apparatus for a multiprocessor system is disclosed in U.S. Pat. No. 4,493,053.

Conventional technology for general purpose multiprocessor systems relies largely upon software and requires a number of items to be checked, thus leading to a large overhead for synchronous processing among tasks (i.e. regulating the priority order of task processing) or processors. Therefore, there arises some problems that tasks cannot be divided in pieces and the task processing order in its parallel operation is restricted unduly. Parallel processing of jobs cannot be positively used, thus resulting in a hardship in attaining high efficiency.

SUMMARY OF THE INVENTION

It is an object of the present invention to provide a synchronous apparatus for processors capable of minimizing the overhead for synchronous processing among tasks or processors in parallel operation of general purpose multi-processors.

The above object of the present invention can be solved by taking into consideration the fact that the number of tasks processed at one time by general purpose multi-processors does not exceed the number of processors, converting all problems of synchronization in parallel processing into the problems in synchronization among processors, and utilizing hardware for synchronous processing among a definite number of processors thereby to minimize software overhead.

Particularly, there is provided correspondence between a plurality of bits and a finite number of processors, respectively. After completing task processing, each processor sets a bit train (word data) in a synchronous register, the bit train having active bits representative of processors executing associated tasks. The processor also makes its task end line active. A comparator compares task end lines of the task processing processors with the bit train to monitor if those processors have completed task processing. If comparison results indicate all true, synchronization is assumed and this status is indicated to the processor. The above operation is realized using hardware to the extent that the system versatility is not damaged.

DESCRIPTION OF THE PREFERRED EMBODIMENTS

A preferred embodiment of this invention will be described with reference to FIG. 1.

Figure 1:
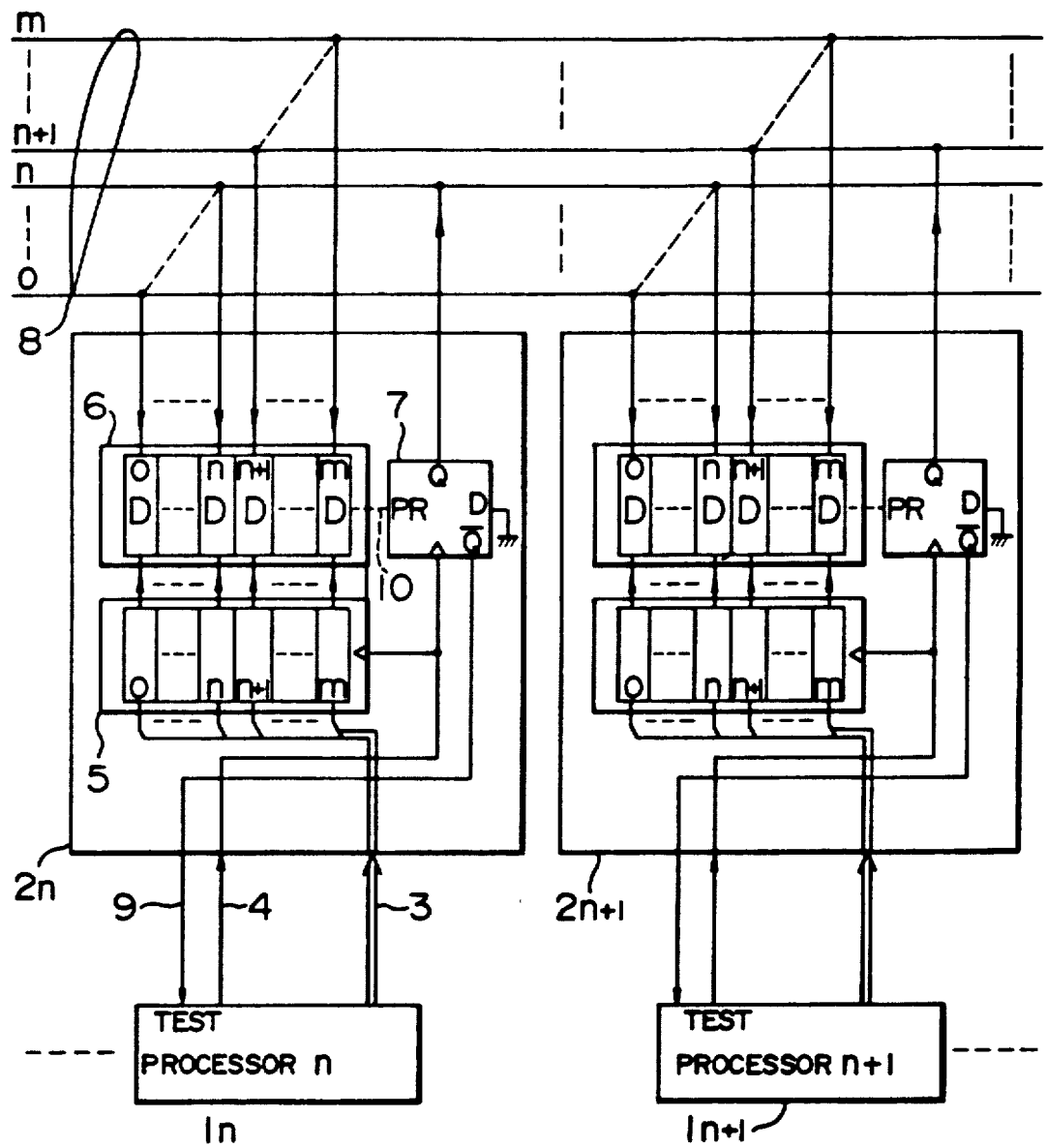
FIG. 1 is a hardware block diagram showing an embodiment of a synchronous apparatus for processors according to the present invention.

A multi-processor system in this embodiment is assumed to be constructed of m processors among which processors $1_n$ and $1_{n+1}$ are shown in FIG. 1. Each processor is provided with a processor synchronizing circuit $2_n$, $2_{n+1}$. Information is transferred among the synchronizing circuits $2_n$ and $2_{n+1}$ via signal lines 8. According to the present invention, processors for executing associated tasks are classified into a group arbitrarily to perform their processings while assuring synchronization of the group. Each processor synchronizing circuit $2_n$, $2_{n+1}$ is provided with a synchronous register 5, a flip-flop 7, a signal line 8 on which the status of the flip-flop 7 is broadcast to each processor, a monitoring circuit 6 and a signaling circuit for informing the check result produced by the monitoring circuit 6 to a corresponding processor. The synchronous register 5, stores therein information regarding which processors are included in a group. The flip-flop 7 is triggered simultaneously with or after the time when signals of "1" or "0" are set in the register 5. The monitoring circuit 6 monitors the broadcast contents for those processors designated in the synchronous register 5 to check if the status of all the processors in a group stored in the register 5 becomes true. There are also provided an access signal 4, a status line 9 and a trigger signal line 10.

Figure 2:
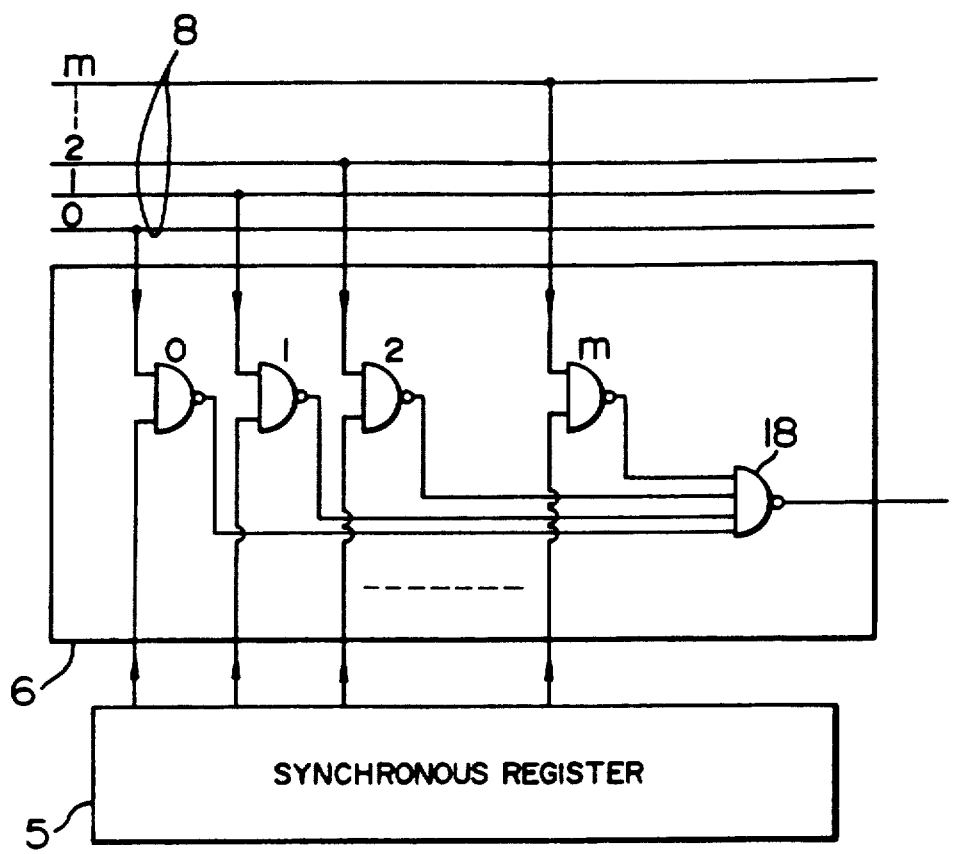
FIG. 2 shows the comparator circuit shown in FIG. 1.

The synchronous operation sequence of the processors in a group will be described. It is assumed that the processors $1_n$ and $1_{n+1}$ of processors $1_0$ to $1_m$ constitutes a group for executing associated tasks. First, the description will be directed to the operation of the processor $1_n$. After completing task processing, the processor $1_n$ sets "1" in the n-th and (n+1)-th bits of the synchronous register 5 via a data line 3 and "0" in the other bits to thereby write a bit train (indicative of a group of processors). During the write operation, the signal line 4 is supplied with an active pulse indicating that the processor n is accessing the synchronous register 5, the pulse serving as a write clock signal of the synchronous register 5. The flip-flop 7 is triggered by the pulse on the signal line 4 at the same time so that a task end signal of "0" level is outputted at its Q terminal, and a status signal of "1" level at its $\overline{Q}$ terminal. The write clock signal of the synchronous register 5 and the trigger signal for the flip-flop 7 may be provided separately to independently execute the information write-in operation to the synchronous register and the output operation of a task end signal by the flip-flop 7. The task end signal from the terminal Q is sent via the n-th task end signal line 8 to each synchronizing circuit $2_0$ to $2_m$ of a corresponding processor. The status signal from the terminal $\overline{Q}$ is inputted to a TEST terminal of the processor $1_n$ via the status line 9 to interrupt the processing by the processor until the TEST input changes to "0"

level. The signal set in the synchronous register 5 and the signals on the signal lines 8 are inputted to the respective units 0 to m of the monitoring circuit 6, respectively, so that each unit receives the corresponding signals on the register 5 and the signal line 8. The internal arrangement of the monitoring circuit 6 is shown in FIG. 2. If the value in the synchronous register is "0", an output of a NAND gate becomes "1" irrespective of the value on the signal line 8. Therefore, if all the values on the task end signal lines 8 corresponding to those bits "1" previously set in the synchronous register 5 become "0", i.e., if the n-th and (n+1)-th task end signal lines 8 becomes "0" in this example, an output of NAND gate 18 changes to "0" so that a trigger signal 10 changes to active "0".

Upon receipt of this trigger signal, the flip-flop 7 is preset to change the task end signal from the Q terminal to "1" level and hence the n-th task end signal line 8 to "1" level. Thus, the trigger signal 10 from the monitoring circuit 6 is changed to "1" level. At the same time, the status signal from the terminal $\bar{Q}$ also changes to "0" level and hence the TEST input of the processor $1_n$ is changed to "0" level, causing the processor $1_n$ to start processing again. The processor $1_{n+1}$ operates in the same manner as above so that in this embodiment the processors $1_n$ and $1_{n+1}$ are synchronized at the time when both processors complete the task processing.

The synchronous operation sequence by the synchronous apparatus for processors of this invention has been described above. According to the present invention, only the write process to the synchronous register is performed by software involving one machine instruction. The other processing is executed using hardware so that the overhead of synchronous processing can be minimized. Further, processors are classified into a group using only a single synchronizing circuit for each processor so that synchronous processing can be performed for the processors belonging to one group. Furthermore, by providing a plurality of synchronizing circuits for each processor, it becomes possible to perform multi-synchronous processing for processors of plural groups. Classification of processors into a group and multi-synchronous processing gives flexibility of parallel processing to thereby enable a highly efficient parallel processing like a data flow per se in a general purpose multi-processor system.

Figure 4:
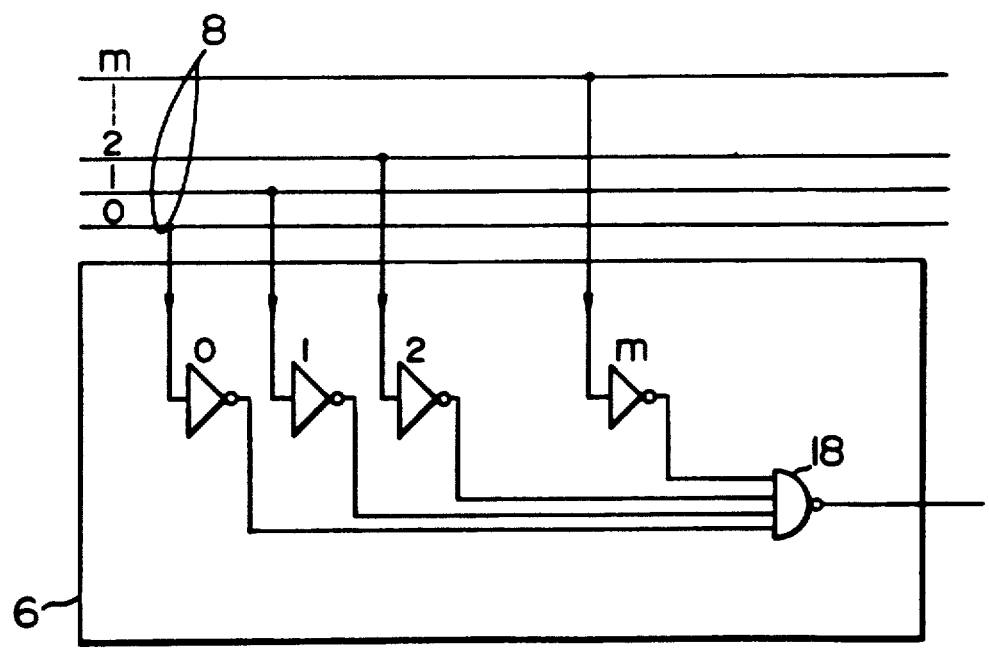
FIG. 4 shows the comparator circuit shown in FIG. 3.
Figure 3:
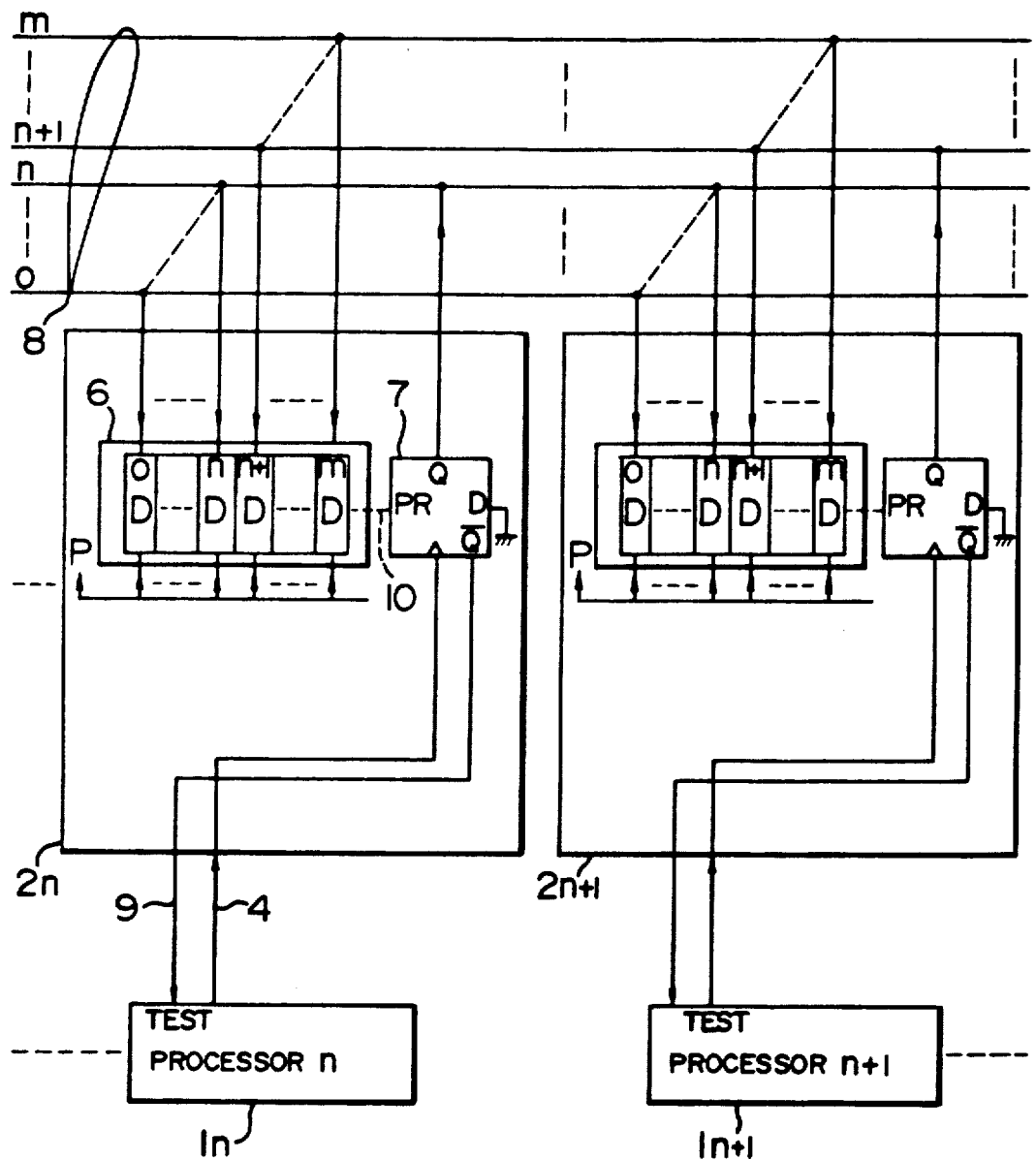
FIG. 3 is a hardware block diagram showing another embodiment of a synchronous apparatus for processors according to the present invention.

Another embodiment of this invention is shown in FIGS. 3 and 4. In this embodiment, all bits in the synchronous register 5 are set to "1" to handle the processors belonging to a single group. Such a case is defined as overall synchronization. The circuit shown in FIG. 3 is used for performing the overall synchronization for all the processors. FIG. 4 shows an example of the monitoring circuit 6 shown in FIG. 3. The fundamental circuit arrangement is identical to that of the embodiment shown in FIG. 1. The overall synchronization is equivalent to that when the objects to be monitored by the monitoring circuit 6 are all set "1". Therefore, if all values at the task end signal lines 8 become "0", the output of the NAND gate 18 changes to "0" level and hence the trigger signal 10 to active "0". If the overall synchronization only is intended, the synchronous register 5 can be omitted in performing synchronous processing for processors.

Figure 5:
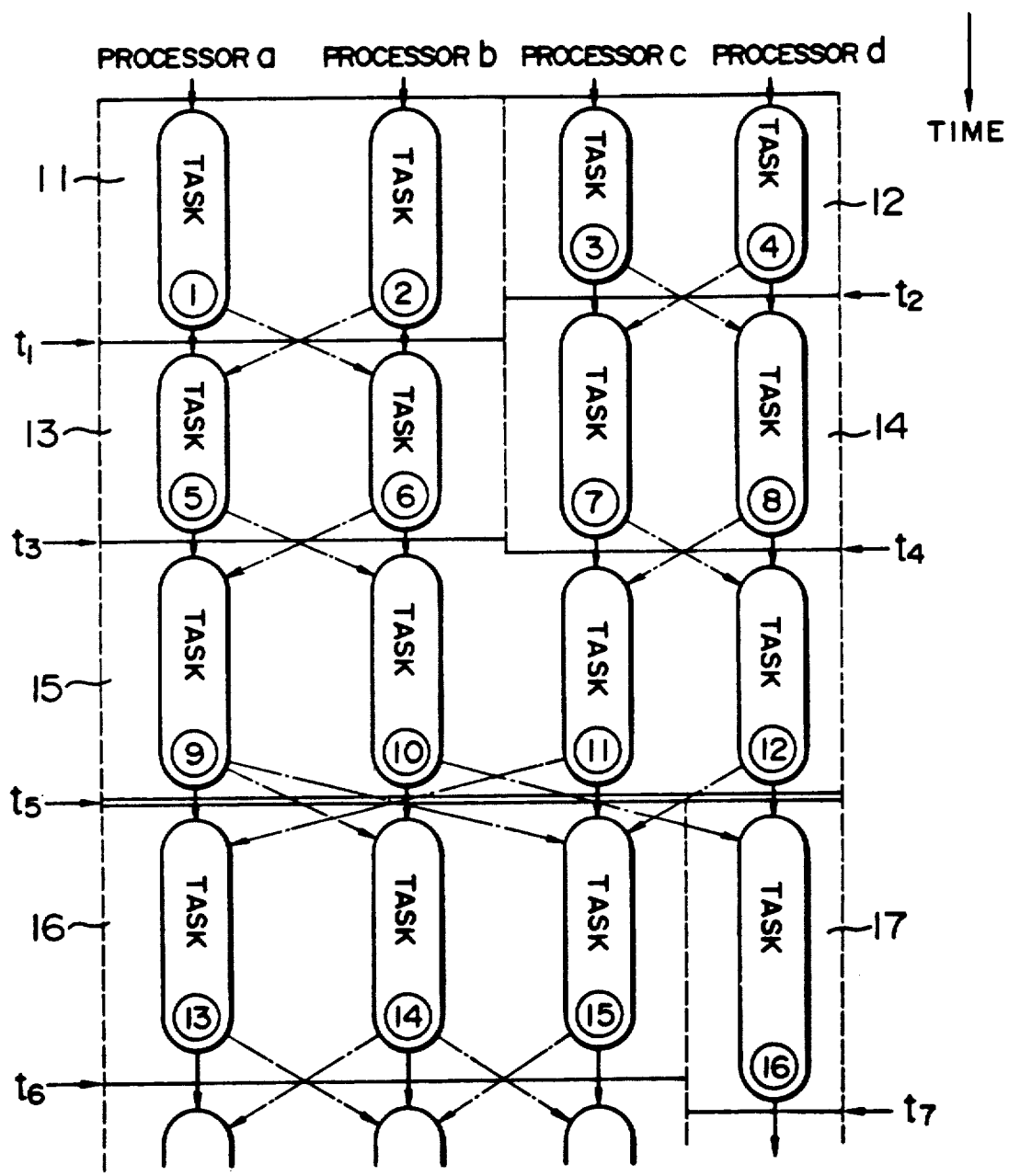
FIG. 5 shows an example of control in parallel processing by the synchronous apparatus of this invention.

FIG. 5 shows how the parallel processing control is performed by the synchronous apparatus among processors of this invention. In the Figure, it is assumed that four processors a to d are controlled to be parallel processed as time passes downward in the Figure by the synchronous apparatus for processors of this invention. First, associated tasks 1 and 2 are processed by the processors a and b. Similarly, tasks 3 and 4 are processed by the processors c and d. The processors executing associated tasks are classified into a group, i.e., in this case, the processor a and b constituting a group 11, and the processors c and d constituting a group 12. A solid line arrow interconnecting tasks represents a process and data flow using the same processor, whereas a one-dot chain line arrow represents a data flow of tasks executed by a different processor in the same group, i.e., a data transfer between processors in the same group. A need arises at time t1 and t2 to transfer data between two groups. After synchronous processing by the synchronous apparatus for processors of this invention, the processed data is exchanged between the processors. Thereafter, the group having the processors a and b proceeds to process tasks 5 and 6, whereas the group having the processors c and d proceeds to process tasks 7 and 8. As above, the synchronous processing by the synchronous apparatus of this invention indicates which processors have been classified into a same group to process the tasks. Since no data transfer occurs between different groups, it becomes possible to independently and flexibly process each group in parallel, to thereby realize a highly efficient parallel processing. Groups 13 and 14 include the same processors as those in the groups 11 and 12 to perform task processing, and synchronous processing at time t3 and t4 to thereafter effect data transfer between processors. At time t5, tasks 9 to 12 become associated with each other so that independence of groups disappears. In this case, after once performing synchronous processing of each group, all processors are synchronized again using another synchronous apparatus for processors. Namely, it can be considered that synchronous processing between groups has been performed by the other synchronous apparatus for processors. Thus, the group 15 contains all the processors. Thereafter, processors a to c executing associated tasks 13 to 15 are caused to constitute a group 16, whereas processor d executing a single task 16 is caused to constitute a group 17. With these re-arranged groups, the synchronous processings are performed in parallel at time t6 and t7. As described so far, use of synchronous apparatus for processors in a multiple manner enables a simple re-arrangement of groups and a more flexible and highly efficient parallel processing.

According to the present invention, in order to process a fixed job in the form of divided tasks by general purpose multi-processors, processors for executing associated tasks are classified into a group to adopt a synchronous processing method for synchronizing processors in the same group or in different groups. Thus, the synchronous apparatus for processors can be implemented using hardware as much as possible to the extent that the system is allowed to be operated using a software program, thereby effectively minimizing software overhead in synchronous processing.

I claim:

1. A synchronous apparatus for synchronizing a plurality of processors comprising, a plurality of synchronizing units each coupled to a respective one said processors, and a signal line connected to said synchronizing units, each of said synchronizing units comprising:
means coupled to a processor for storing information indicating whether each of the processors belongs to a group of selected processors for executing parallelly given tasks;

means for producing active task end information when said processor has finished the task to be executed by that processor and for sending said task end information to said signal line;

means coupled to said signal line for receiving the task end information transmitted through said signal line from the sending means of the synchronizing units of the processors and for monitoring whether the processors, which the information stored in said storing means identifies as belonging to the group of selected processors, have completed the given tasks, respectively, based on the received task end information relating to those selected processors; and means coupled to said processor for transferring a result of the monitoring by said monitoring means to said processor.

2. A synchronous apparatus according to claim 1, wherein said information storing means is a synchronous register having respective bit positions for storing a bit of information for each respective processor.

3. A synchronous apparatus according to claim 2, wherein said bit information stored in said synchronous register is indicative of whether each of the processors belongs to the group.

4. A synchronous apparatus according to claim 2, wherein said monitoring means includes logic units each provided for a respective one of said bit positions, each logic unit being connected to said signal line to receive task end information from said generating means for a respective processor and the bit information from a respective bit position of said synchronous register.

5. A synchronous apparatus for synchronizing the processing of tasks by a plurality of processors, comprising:

a respective synchronous register connected to each processor for storing information received from the processor identifying a group of processors executing parallel processing for related tasks;

a respective flip-flop coupled to each processor to be tiggered by the processor when information is set by the processor in said synchronous register at the time the processor completes a task;

a signal line coupled to each flip-flop for carrying a status signal indicating the state of each flip-flop;

means provided for each processor for monitoring those of the status signals related to the group of processors identified by the information stored in said synchronous register of the processor to determine when all flip-flops of the group of processors have been triggered; and means for presetting all flip-flops of the group when it is detected that all flip-flops of the group have been triggered.

6. A synchronous apparatus for synchronizing the parallel processing of a plurality of tasks by designated ones of a plurality of processors, comprising:

a plurality of store means each coupled to a respective processor for storing information identifying processors, including the processor coupled thereto, which operate as a group for executing parallel processing for related tasks;

means for generating task end information for each processor when a task has been completed by the processor;

a plurality of monitoring means each coupled to a respective store means for monitoring task end information generated for those processors forming said group of processors identified by information stored in said store means to check if a processing of associated tasks has been completed by all processors in said group;

a signal line coupled to said generating means and said monitoring means for transferring said task end information between processors; and means for transferring a result of checking by said monitoring means to said processors.

7. A synchronous apparatus for synchronizing a plurality of processors comprising, synchronizing units coupled to said processors, respectively, and a signal line connected to said synchronizing units, each of said synchronizing units comprising:

a synchronous register coupled to a processor for storing information indicating whether each of the processors belongs to a group of selected processors for executing parallelly given tasks;

a flip-flop coupled to said processor and said signal line for producing and sending a status signal to the signal line when said processor has finished the task to be executed by that processor;

means coupled to said signal line for receiving status signals from the processors and for judging whether the processors, which the information stored in said storing means indicates belong to the group of selected processors, have completed the given tasks, based on said received status signals relating to the selected processors; and means coupled to said processor for transferring a result of the judging by said monitoring means to said processor.

8. A synchronous apparatus for synchronizing a plurality of processors extending parallelly given tasks, including a synchronizing unit for each processor, each synchronizing unit comprising:

means for storing respective first signals relating to respective processors, each first signal indicating whether the respective processor is designed for executing a given task;

means for providing respective second signals relating to respective processors, each second signal indicating that the respective processor has finished a given task;

means for monitoring whether the processors are in synchronism with each other in execution of given tasks based on the second signals relating to those processors which the first signals stored in said storing means indicate are designated for executing the given tasks; and means for transferring a result of the monitoring by said monitoring means to the respective processors.

9. A synchronous apparatus for synchronizing a plurality of processors and including respective synchronizing units coupled to respective processors, each of said synchronizing units comprising:

means for storing respective status information indicating whether respective processors belong to a group of processors selected for executing parallelly given tasks;

means including a flip-flop for producing, when activated, a task end signal indicating that the processor coupled to the synchronizing unit has finished the task to be executed by that processor;

means for activating said flip-flop in response to a command signal produced from the processor coupled to the synchronizing unit when said processor has finished a task;

means for receiving task end signals produced by the synchronizing units of the respective processors and producing a synchronization end signal when all the task end signals relating to the processors which said status information indicates belong to the group of selected processors are received; and means responsive to the synchronization end signal to deactivate said flip flop.

10. A synchronous apparatus according to claim 9, each synchronizing unit further comprising means responsive to the synchronization end signal to produce and send to the processor coupled to the synchronizing unit a synchronization check signal.

11. A synchronous apparatus according to claim 9, each synchronizing unit further comprising means for transmitting status information from the processor coupled to said synchronizing unit to said storing means.

12. A synchronous apparatus according to claim 11, wherein said storing means includes a register whose contents are rewritten and the status information is transmitted in the form of a trigger pulse.

13. A synchronous apparatus according to claim 11, further comprising means responsive to the synchronization end signal to produce and send to a processor a synchronization check signal.

14. A synchronous apparatus for synchronizing a plurality of processors and including respective synchronizing units coupled to respective processors, each of said synchronizing units comprising:

means for producing respective data indicating whether each of the processors belongs to a group of processors selected for executing parallelly given tasks;

means for receiving said data from said data producing means and for storing said data;

means including a flip-flop for producing, when activated, a task end signal indicating that the processor coupled to the synchronizing unit has finished a task to be executed by that processor;

means for activating said flip-flop in response to a command signal produced from the processor coupled to the synchronizing unit when that processor has finished the task;

means for receiving the task end signals produced by the flip-flops of the respective processors and for producing a synchronization end signal when all the task end signals relating to processors which the data stored in said storing means indicates belong to the group of the selected processors are received;

means responsive to said synchronization end signal for deactivating said flip-flop; and means responsive to a synchronization end signal to produce and send a synchronization check signal to the processor coupled to the synchronization unit.

15. A synchronous apparatus for synchronizing a plurality of processors and including respective synchronizing units coupled to respective processors, each of said synchronizing units comprising:

means including a flip-flop for producing, when activated, a task end signal indicating that the processor coupled to the synchronizing unit has finished the task;

means for activating said flip-flop in response to a command signal produced from the processor coupled to the synchronizing unit when that processor has finished a task;

means responsive to said task end signals produced from the flip-flops of the respective processors for monitoring whether the processors have completed the given tasks, and for producing a synchronization end signal when all said tasks have been completed; and means responsive to the synchronization end signal for deactivating said flip-flop.

16. A synchronous apparatus for synchronizing the parallel processing of a plurality of tasks by a plurality of processors, including a respective processor synchronizing unit for each one of the processors and a signal line connected to the respective processor synchronizing units for communicating information among the processor synchronizing units for the respective processors, each processor synchronizing unit provided for one processor, comprising:

store means for storing information identifying those processors constituting one group together with said one processor for executing parallel processing for given tasks;

flip-flop means which is set when said one processor has completed the given task thereby generating a first signal indicating that said one processor has completed the given task and reset in response to a trigger signal applied thereto thereby generating a second signal for allowing said one processor to execute a next task;

means for transmitting the first signal to the signal line; and monitoring means connected to the signal line and the store means for receiving from the signal line and monitoring the first signals relating to the processors of the one group identified by the information stored in said store means and producing said trigger signal upon receiving all the first signals relating to the processors of the one group.

17. A synchronous apparatus for synchronizing a plurality of processors, including respective synchronizing units provided for respective processors, and a signal line connected to said synchronizing units, each one of said synchronizing units provided for a respective processor comprising:

means for storing information indicating those processors which are selected, together with the respective processor for which the one synchronizing unit is provided, to constitute one group for executing parallelly given tasks;

flip-flop means for producing active task end information when said respective processor has finished its given task and for producing a status signal which allows the respective processor to execute a next task in response to a trigger signal applied thereto; and means connected to receive the task end information transmitted through said signal line from the sending means of the synchronizing units of the processors for monitoring whether all the task end information transmitted from the processors, which the information stored in said storing means indicates belong to the one group, have been received and for producing the trigger signal to be applied to said flip-flop means when all task end information has been received.

18. A multiple synchronizing system for synchronizing the parallel processing of given tasks by a plurality of processors comprising synchronizing subsystems respectively provided for respective groups of processors, and a signal line connected to said synchronizing subsystems, each of said synchronizing subsystems comprising a plurality of synchronizing units each coupled to a respective processor, each synchronizing unit provided for a respective processor, comprising:

means for storing information indicating those processors which are selected, together with the respective processor coupled to the synchronizing unit, to constitute a synchronizing subsystem for executing parallelly given tasks, respectively;

flip-flop means for producing active task end information when the respective processor coupled to the synchronizing unit has finished its given task and for producing a status signal which allows said respective processor to execute a next task upon receiving a trigger signal applied thereto; and means connected to receive the task end information transmitted through said signal line from the sending means of the synchronizing units of the processors for monitoring whether all the task end information transmitted from the processors, which the information stored in said storing means indicates belong to the same synchronizing subsystem have been received and for producing the trigger signal to be applied to said flip-flop means when all task end information has been received.

* * * * *